Figure 1:
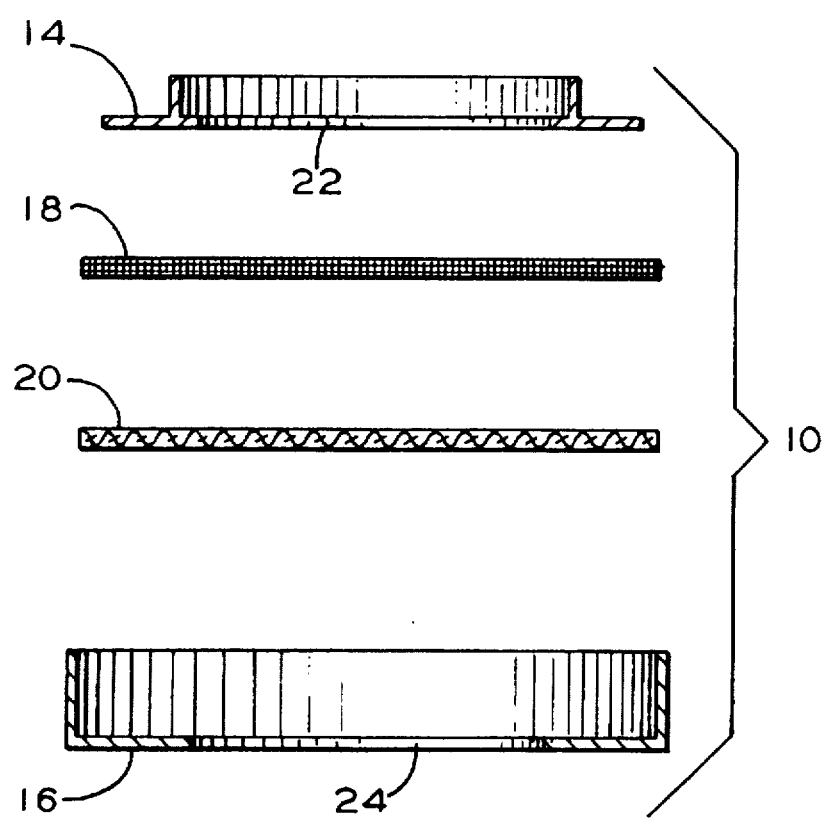

United States Patent [19]
Hunsinger et al.

[11] Patent Number: 5,893,945
[45] Date of Patent: Apr. 13, 1999

[54] END STRUCTURES FOR FILTER CANISTERS

[75] Inventors: Gary J. Hunsinger, Pittsford; Michael Leggett, Honeoye Falls, both of N.Y.

[73] Assignee: Shawndra Products, Inc., Lima, N.Y.

[21] Appl. No.: 08/950,321

[22] Filed: Oct. 14, 1997

[51] Int. Cl.⁶ .................................................. B01D 24/20
[52] U.S. Cl. .................... 96/135; 96/147; 96/152; 55/510; 55/518; 55/519
[58] Field of Search ................... 55/510, 518, 519; 95/117; 96/135, 147, 152

[56] References Cited

U.S. PATENT DOCUMENTS

| | | | |
|---|---|---|---|
| 4,350,508 | 9/1982 | Santoro et al. | 96/135 |
| 5,427,609 | 6/1995 | Zoglman et al. | 96/135 |
| 5,478,379 | 12/1995 | Bevins | 96/135 |
| 5,500,038 | 3/1996 | Dauber et al. | 96/135 |
| 5,569,316 | 10/1996 | Flaugher et al. | 96/135 |
| 5,716,432 | 2/1998 | Perrine | 96/135 |
| 5,718,743 | 2/1998 | Donnelly et al. | 96/135 |

*Primary Examiner*—Jay H. Woo
*Assistant Examiner*—Minh-Chau T. Pham
*Attorney, Agent, or Firm*—James Ray & Associates

[57] ABSTRACT

An end cap assembly for a filter canister includes outer and inner metal caps each having an opening therein for general axial alignment with each other when secured to the ends of the canister. An inner metal plate or layer made of a wire mesh material and a second inner plate or layer of an air permeable cloth material is provided such that the inner plates or layers are disposed between the outer and inner metal caps and secured together to form a unitary end cap assembly.

7 Claims, 1 Drawing Sheet

END STRUCTURES FOR FILTER CANISTERS

FIELD OF THE INVENTION

The present invention relates, generally, to canister structures for holding a filter media such as a moisture absorbing desiccant and, more particularly, this invention relates to the ends of a canister that provide air flow through the canister and through the filter media.

BACKGROUND OF THE INVENTION

In providing desiccant inserts for air drying equipment, as explained in a companion case entitled "Telescoping Canister For Filter Materials" filed on even date herewith by the same inventors, the desiccant insert includes a flexible manipulative bag for containing the desiccant. The bag per se has certain disadvantages as discussed in the companion application. The flexible bag is employed in a cavity of an air drying container connected in a conduit or pipe of an air brake system, for example, to remove moisture from the brake system.

SUMMARY OF THE INVENTION

The present invention is directed to end assemblies for rigid, hard wall canisters employed in cavities of air drying systems. Each end assembly is comprised of outer and inner metal caps, an inner plate of a wire mesh material and an inner air permeable plate, which can be a flexible or rigid layer of cloth material, such as a polyester felt. The end caps and plates of the assembly are assembled using a press fit process in which the outer metal cap and inner mesh and cloth plates or layers are forced into the inner cap which has a shallow cup-shaped configuration and is sized to receive the outer metal cap and inner plates or layers in such a press fit manner.

After the components are press-fitted together, the cup of the inner metal cap is filled with a liquid, metal adhering compound, such as a rubber or plastisol compound. Two such end assemblies are then placed on the ends of the metal canister, and the compound heated and cured to cement and secure the end assemblies to the metal wall of the canister. In this process, the cloth plate or layer of the assembly assists in keeping the liquid compound wicking and running until it is cured and sets up in the process of sealing the end cap assemblies to the wall of the canister.

OBJECTIVES OF THE INVENTION

It is, therefore, an objective of the invention to provide the ends of a metal filter canister with end wall assemblies that are permanently secured to the canister wall and which seals the end wall assemblies to the ends of the canister using a liquid, metal adhering, curable compound.

Another objective of the invention is to provide a filter canister with end wall assemblies that allow filter material in the canister to be shipped to a location for final product installation, or be inventoried, in a manner that keeps the filter media intact and ready for use when needed.

THE DRAWINGS

Figure 2:
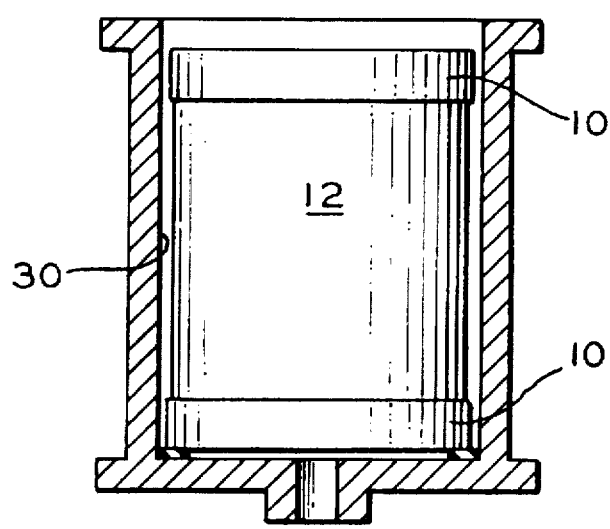

The invention, along with advantages and objectives, will be better understood from consideration of the following detailed description and the accompanying drawings in which, FIG. 1 is an exploded, side elevation view of the components of an end cap assembly of the invention, and FIG. 2 is a sectional view of an air dryer cavity for receiving and containing a canister having the end wall assemblies of the invention.

PREFERRED EMBODIMENT OF THE INVENTION

Referring now to the exploded view of FIG. 1 of the drawings, an end cap assembly 10 is shown for closing one end of a filter canister 12 (FIG. 2). The end cap assembly comprises outer and inner metal caps 14 and 16 and two inner planar plates or layers 18 and 20 of air permeable material. End caps 14 and 16 are provided with openings 22 and 24, respectively, in transverse walls of the end caps. Inner end cap 16 is in the form of a cup, the inside dimensions of which are sized to receive and seat outer (and planar) end cap 14 and inner plates 18 and 20 in a press fit, i.e., components 14, 18 and 20, when placed in the order depicted in FIG. 1, are pressed into cap 16 by a suitable press (not shown). If the end caps and inner plates are circular (in plan view) the inside diameter of end cap 16 would be slightly greater than the diameters of end cap 14 and inner plates 18 and 20.

Plate 18 is preferably made from a metal, porous metal wire material, such as stainless steel or a suitable aluminum alloy, while plate 20 is made from an air permeable cloth, such as a polyester felt, though other suitable air permeable materials can be used. Preferably, inner plates 18 and 20 are relatively rigid to provide ease of handling and assembly, but they can be made of flexible air permeable materials. Their purpose is to breach openings 22 and 24, provided in transverse walls of the metal caps 14 and 16, so that the filter media or component (not shown) located in canister 12 (FIG. 2) is held in place in the canister after it receives an end cap assembly 10 in or on each end of the canister.

The material of the end caps 14 and 16 can be stainless steel, a suitable aluminum alloy, or other durable metals.

When pressed into cup shaped cap 16, the planar components 14, 18 and 20 move to the lower transverse wall of the cap and to opening 24 therein. When two cap assemblies 10 are secured to opposed ends of a metal wall canister, openings 22 and 24 in the two assemblies are in general axial alignment with each other.

After the components of FIG. 1 are pressed together, the cup of end cap 16 is supplied with a liquid, curable rubber compound that adheres to metal, such as a suitable plastisol material. One end of the metal canister is now inserted into the cup containing the liquid compound, and the end cap assembly heated to an appropriate temperature for an appropriate length of time. The liquid compound flows about the canister end and into any space between the canister end and end cap assembly 10, and then cures to seal the end cap assembly to the canister end, as the compound cools.

This procedure is performed for each end of the canister, the second performance being undertaken after a filter media is disposed in the canister. With the end cap assemblies secured on and sealed to the canister wall, the filter media is fully contained therein, i.e., the wire mesh and cloth plates, or layers 18 and 20, in combination with the transverse walls of end caps 14 and 16 retain the filter media in the canister while permitting the air flow through the canister and end cap assemblies and through the filter media contained in the canister. In FIG. 2 of the drawings, air flows into one end of a cavity 30 of an air drying system (not otherwise shown in FIG. 2) and out of the cavity after passing through canister 12 and the two end assemblies 10 of the invention fixed to the ends of canister 12.

While the presently preferred embodiment and related aspects thereof for carrying out the instant procedure for making end cap assemblies and securing the same to canister ends have been set forth in detail above, those persons skilled in the art to which this invention pertains will recognize that various alterations and changes can be made to the instant invention without departing from the spirit and scope of the claims appended hereto.

We claim:

1. An end cap assembly for a metal filter canister comprising:

outer and inner metal caps each having an opening therein for general axial alignment with each other when secured to an end of the metal filter canister, a first inner metal plate or layer made of a wire mesh material, and a second inner plate or layer made of a cloth material, said inner plates or layers being disposed between the outer and inner metal caps and secured to the end of said metal filter canister by a metal adhering compound to form a unitary, integral end cap assembly permanently secured to said metal filter canister.

2. The end cap assembly of claim 1 wherein the metal adhering compound is a curable rubber compound.

3. The end cap assembly of claim 2 wherein the rubber compound is a plastisol material.

4. The end cap assembly of claim 1 wherein the outer metal cap is planar and the inner metal cap is cup shaped and sized to receive the planar outer metal cap and the first and second inner plates or layers.

5. The end cap assembly of claim 4 wherein the relative dimensions of the metal caps and inner plates are such that the inner plates and planar outer metal cap are press fitted into the cup shaped inner metal cap.

6. A method of making an end cap assembly for a metal filter canister having a side wall and open ends, and for securing said end cap assembly to said side wall at one of said open ends, the method comprising:

placing together one upon the other an outer metal end cap, an inner wire mesh plate, an inner plate of air permeable cloth material, and an inner metal end cap, pressing the end caps and plates together to form a unitary end cap assembly, placing the end cap assembly at one of the open ends of the canister, supplying the inner end cap with a liquid, metal adhering curable compound, and curing said compound to secure the end caps and inner plates of the cap assembly together and to the side wall of said canister.

7. The method of claim 6 wherein the inner end cap has a cup shape of shallow proportions, the method including:

pressing the outer end cap and the inner plates into the inner cup-shaped end cap to form an integral, unitary end structure for the canister.

* * * * *